United States Patent
Harada et al.

(10) Patent No.: US 12,096,384 B2
(45) Date of Patent: Sep. 17, 2024

(54) USER TERMINAL AND RADIO COMMUNICATION METHOD

(71) Applicant: NTT DOCOMO, INC., Tokyo (JP)

(72) Inventors: Hiroki Harada, Tokyo (JP); Daisuke Murayama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 494 days.

(21) Appl. No.: 17/422,919

(22) PCT Filed: Jan. 16, 2019

(86) PCT No.: PCT/JP2019/001156
§ 371 (c)(1),
(2) Date: Jul. 14, 2021

(87) PCT Pub. No.: WO2020/148841
PCT Pub. Date: Jul. 23, 2020

(65) Prior Publication Data
US 2022/0095253 A1 Mar. 24, 2022

(51) Int. Cl.
*H04W 56/00* (2009.01)
(52) U.S. Cl.
CPC .................... *H04W 56/001* (2013.01)
(58) Field of Classification Search
None
See application file for complete search history.

(56) References Cited

U.S. PATENT DOCUMENTS

| | | | | |
|---|---|---|---|---|
| 2019/0149383 A1* | 5/2019 | Ko | .................... | H04W 56/001 370/329 |
| 2019/0191457 A1* | 6/2019 | Si | .................... | H04L 5/0082 |
| 2019/0387546 A1* | 12/2019 | Li | .................... | H04L 27/26132 |

OTHER PUBLICATIONS

Access and Mobility Procedure for NR-U by Samsung (Year: 2018).*
3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).
3GPP TSG-RAN WG2 NR Ad hoc 1801; R2-1801519 "Size of NR SIB1 [N.266]" Nokia, Nokia Shanghai Bell; Vancouver, Canada; Jan. 22-26, 2018 (5 pages).
3GPP TSG RAN WG1 Meeting RAN1#94BIS; R1-1811885 "Feature lead summary #1 of initial access and mobility" Charter Communications; Chengdu, P.R. China; Oct. 8-12, 2018 (11 pages).

(Continued)

*Primary Examiner* — Alex Skripnikov
*Assistant Examiner* — Pamit Kaur
(74) *Attorney, Agent, or Firm* — Osha Bergman Watanabe & Burton LLP

(57) ABSTRACT

A user terminal according to an aspect of the present disclosure includes a receiving section that receives information related to positions of synchronization signal blocks (SSBs) within a synchronization signal (SS) burst, and a control section that determines, based on the information related to the positions of the SSBs within the SS burst, a Quasi-Co-Location (QCL) assumption between SSB indices within a transmission window for a discovery reference signal in a carrier to which listening is applied. According to an aspect of the present disclosure, the PDCCH can be suitably monitored in the NR-U carrier.

7 Claims, 13 Drawing Sheets

PDCCH MONITORING OCCASION

(56) References Cited

OTHER PUBLICATIONS

2GPP TSG RAN WG1 Meeting #94bis; R1-1810270 "Initial access and mobility for NR unlicensed operation" LG Electronics; Chengdu, China; Oct. 8-12, 2018 (14 pages).
3GPP TSG RAN WG1 Meeting #94; R1-1808482 "Maintenance for Downlink signals and channels" LG Electronics; Gothenburg, Sweden; Aug. 20-24, 2018 (18 pages).
International Search Report issued in International Application No. PCT/JP2019/001156, mailed Apr. 2, 2019 (5 pages).
Written Opinion issued in International Application No. PCT/JP2019/001156; Dated Apr. 2, 2019 (4 pages).
Extended European Search Report issued in counterpart European Patent Application No. 19910196.5, mailed on Jul. 14, 2022 (9 pages).
Samsung; "Initial Access and Mobility Procedure for NR-U"; 3GPP TSG RAN WG1 Meeting #95, R1-1812978; Spokane, USA; Nov. 12-16, 2018 (9 pages).
3GPP TS 38.331 V15.4.0; "3rd Generation Partnership Project; Technical Specification Group Radio Access Network; NR; Radio Resource Control (RRC) protocol specification (Release 15)"; Dec. 2018 (474 pages).

\* cited by examiner

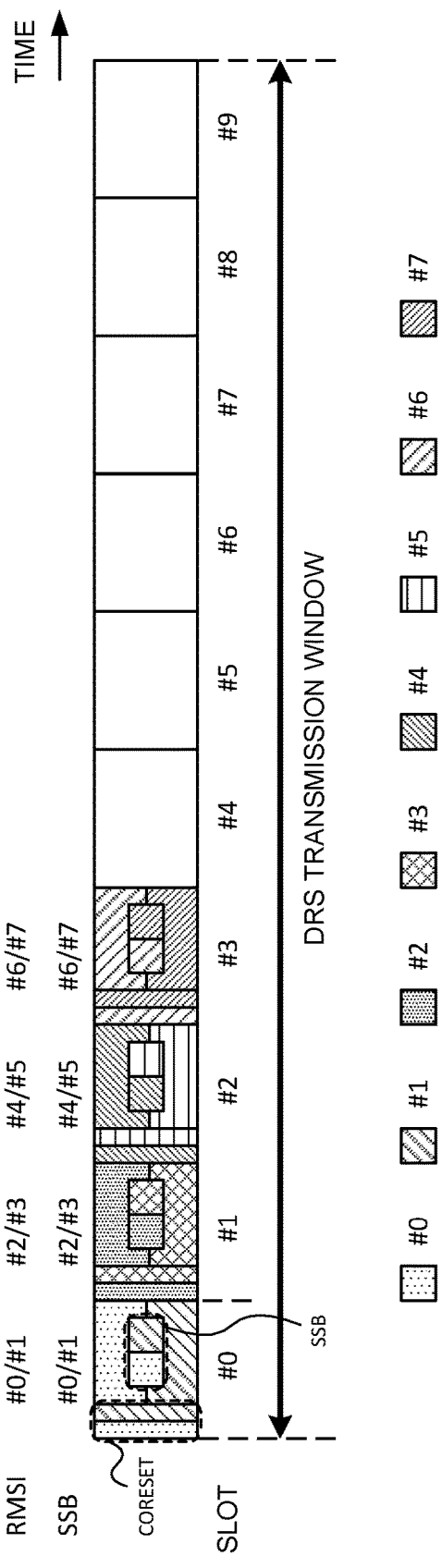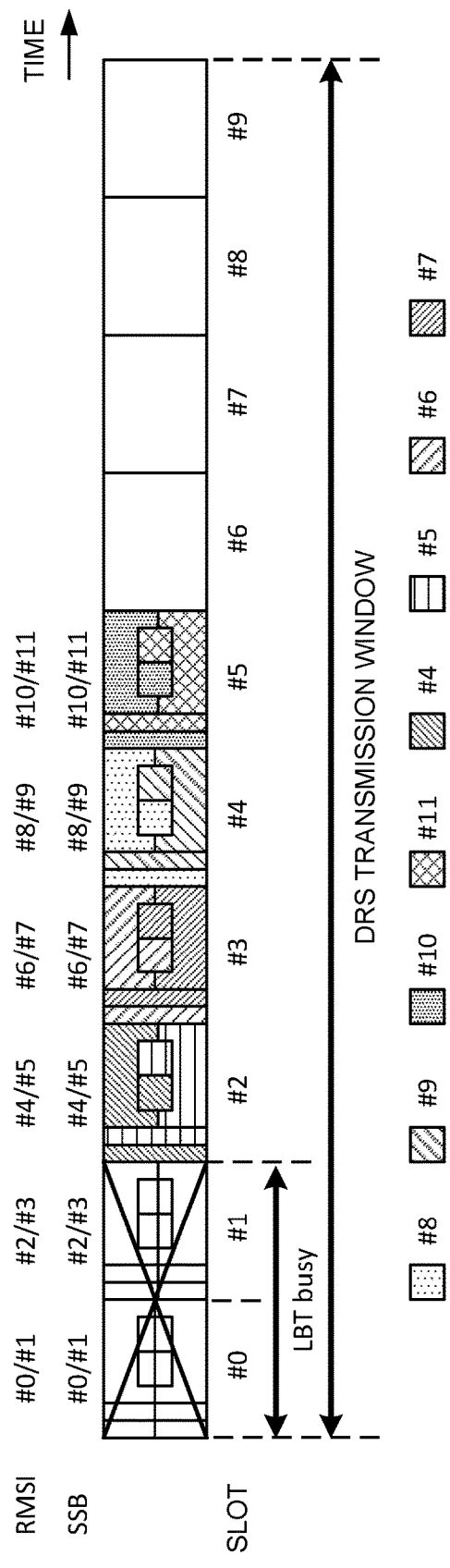

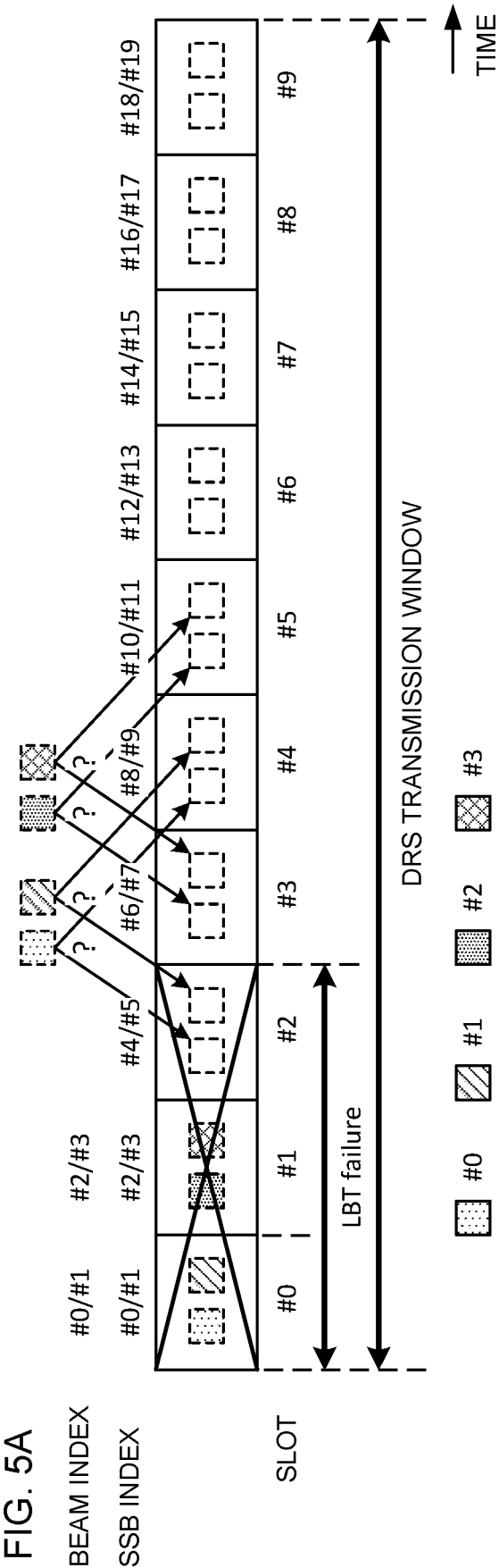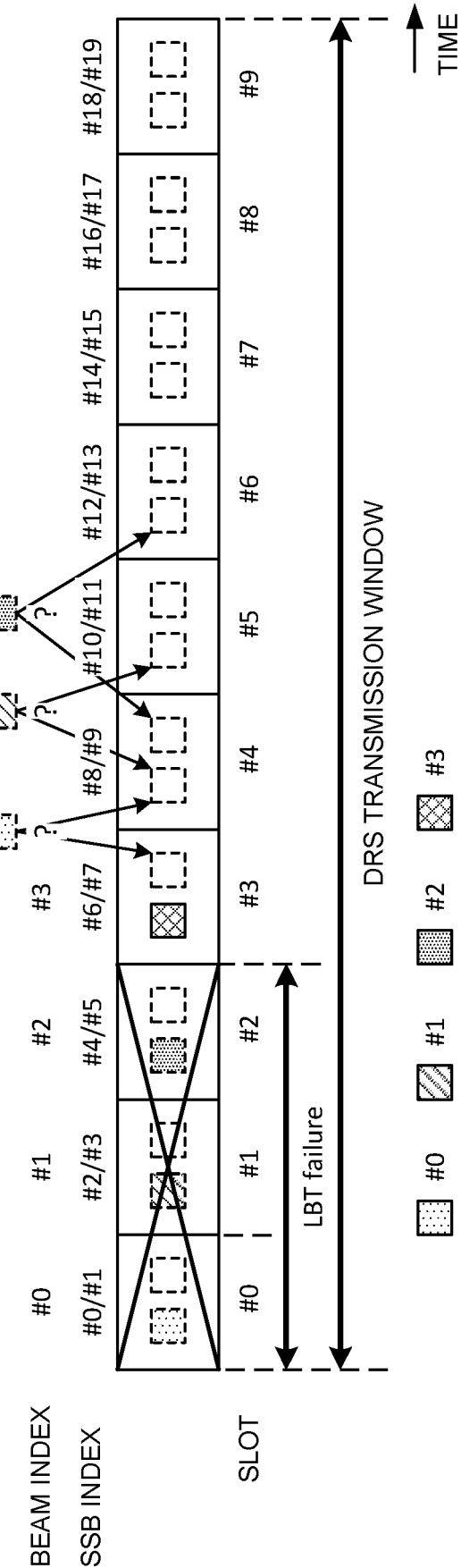

USER TERMINAL AND RADIO COMMUNICATION METHOD

TECHNICAL FIELD

The present disclosure relates to a user terminal and a radio communication method in next-generation mobile communication systems.

BACKGROUND ART

In Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G))," "5G+ (plus)," "New Radio (NR)," "3GPP Rel. 15 (or later versions)," and so on) are also under study.

For existing LTE systems (for example, Rel. 8 to Rel. 12), specifications have been formulated on the assumption that exclusive operation is performed on frequency bands (also referred to as licensed bands, licensed carriers, licensed component carrier (licensed CCs), and so on) for which a communication operator is licensed. As the licensed CC, for example, 800 MHz, 1.7 GHz, 2 GHz, and so on are used.

For existing LTE systems (for example, Rel. 13), the usage of frequency bands (also referred to as unlicensed bands, unlicensed carriers, unlicensed CCs, and so on) different from the licensed bands is supported to expand frequency bands. As the unlicensed bands, for example, a 2.4-GHz band, 5-GHz band, and so on are assumed in which Wi-Fi (registered trademark) or Bluetooth (registered trademark) can be used.

In Rel. 13, carrier aggregation (CA) is supported in which a carrier (CC) in a licensed band is integrated with a carrier (CC) in an unlicensed band. Communication using an unlicensed band with a licensed band is referred to as LAA (License-Assisted Access).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For NR, the usage of unlicensed bands has also been studied. Before data transmission in an unlicensed band, listening (also referred to as LBT (Listen Before Talk)) is performed.

In NR, Synchronization Signal (SS)/Physical Broadcast CHannel (PBCH) blocks (SS blocks (SSBs)) are utilized. For a user terminal (for example, User Equipment (UE)), a higher layer parameter (for example, a Radio Resource Control (RRC) parameter "ssb-PositionsInBurst") related to a transmission unit with some SSBs (SS burst, SS burst set, simply referred to as a burst, and so on) may be configured.

However, sufficient studies have not been conducted about suitable determination, by the UE, of a Quasi-Co-Location (QCL) assumption between SSB indices in consideration of an LBT failure in a case where ssb-PositionsInBurst is used to notify semi-statically transmitted SSBs. Lack of definite specification for this determination may prevent suitable monitoring of a PDCCH, reducing communication throughput.

Thus, an object of the present disclosure is to provide a user terminal and a radio communication method that can suitably monitor the PDCCH in an NR-U carrier.

Solution to Problem

A user terminal according to an aspect of the present disclosure includes a receiving section that receives information related to positions of synchronization signal blocks (SSBs) within a synchronization signal (SS) burst, and a control section that determines, based on the information related to the positions of the SSBs within the SS burst, a Quasi-Co-Location (QCL) assumption between SSB indices within a transmission window for a discovery reference signal in a carrier to which listening is applied.

Advantageous Effects of Invention

Thus, according to an aspect of the present disclosure, the PDCCH can be suitably monitored in the NR-U carrier.

BRIEF DESCRIPTION OF DRAWINGS

FIGS. 3A and 3B are diagrams to show an example of expansion of SSB transmission candidate positions;

FIGS. 5A and 5B are diagrams to show an example of a problem with a QCL assumption for SSBs;

DESCRIPTION OF EMBODIMENTS

<Unlicensed Band>

Figure 1:
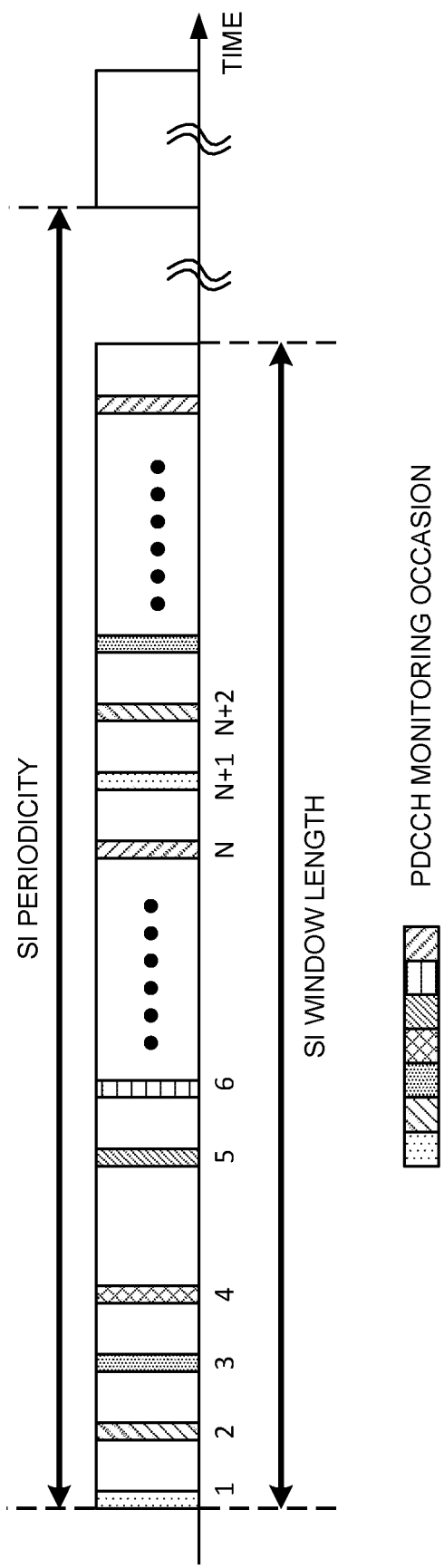
FIG. 1 is a diagram to show an example of a relationship between PDCCH monitoring occasions and SSBs for OSI in Rel-15 NR.

It is assumed that a plurality of systems, for example, a Wi-Fi system, a system supporting LAA (LAA system), and so on coexist in an unlicensed band (for example, a 2.4-GHz band, 5-GHz band, and a 6-GHz band) and thus that collision avoidance and/or interference control among the plurality of systems may be required.

For example, a Wi-Fi system utilizing an unlicensed band employs Carrier Sense Multiple Access (CSMA)/Collision Avoidance (CA) for the purpose of collision avoidance and/or interference control. In CSMA/CA, a certain time DIFS (Distributed access Inter Frame Space) is provided before transmission, and a transmission apparatus conforms absence of other transmission signals (performs carrier sense) and then performs data transmission. After data transmission, the transmission apparatus waits for ACKnowledgement (ACK) from a receiving apparatus. In a case of failing to receive ACK within a certain time, the transmission apparatus determines that a collision has occurred and performs retransmission.

In LAA in an existing LTE system (for example, Rel. 13), a transmission apparatus for data performs, before data transmission in an unlicensed band, listening for checking for presence/absence of transmission from any other apparatus (for example, a base station, a user terminal, a Wi-Fi apparatus, or the like) (also referred to as Listen Before Talk (LBT), Clear Channel Assessment (CCA), carrier sense, channel sensing, a channel access operation, or the like).

The transmission apparatus may be, for example, a base station (for example, gNodeB (gNB)) for a downlink (DL) and a user terminal (for example, User Equipment (UE)) for uplink (UL). A receiving apparatus receiving data from the transmitting apparatus may be, for example, a UE for the DL and a base station for the UL.

In LAA in the existing LTE system, the transmitting apparatus starts data transmission a certain period after detection of lack of transmission (idle state) from any other apparatus during LBT (for example, immediately after the detection or after a period for back-off).

An NR system using an unlicensed band may be referred to as an NR-Unlicensed (U) system, an NR LAA system, or the like. Dual connectivity (DC) of a licensed band and an unlicensed band, stand-alone (SA) of an unlicensed band, and the like may be employed for NR-U.

For coexistence with other systems or other operators, a node in NR-U (for example, a base station, UE) starts transmission after confirming the presence of a free (idle) channel by LBT.

In the NR-U system, the base station or UE acquires a transmission opportunity (TxOP) and performs transmission in a case where an LBT result indicates an idle state (LBT-idle). The base station or UE performs no transmission in a case where the LBT result indicates a busy state (LBT-busy). The time for a transmission opportunity is also referred to as a COT (Channel Occupancy Time).

Note that LBT-idle may be replaced with LBT success. LBT-busy may be replaced with LBT failure.

<SSB>

In NR, synchronization signal/broadcast channel (Synchronization Signal/Physical Broadcast CHannel (SS/PBCH)) blocks are utilized. The SS/PBCH block may be a signal block including a primary synchronization signal (PSS), a secondary synchronization signal (SSS), and a broadcast channel (Physical Broadcast Channel (PBCH)) (and a demodulation reference signal (DMRS) for PBCH). The SS/PBCH block may be referred to as a synchronization signal block (SSB).

Rel-15 NR specifies a PDCCH monitoring operation for receiving other system information (OSI) and paging. Note that OSI may correspond to the system information other than remaining minimum system information (RMSI).

For example, in a case where the ID of a search space for OSI or paging is zero (in other words, in a case where in search space #0, the UE monitors a PDCCH for OSI or paging), monitoring occasions for the PDCCH (PDCCH monitoring occasions) may be the same as PDCCH monitoring occasions for System Information Block 1 (SIB1). The relationship between the PDCCH monitoring occasions and SSB indices (mapping) may be determined based on § 13 of 3GPP TS 38.213. The PDCCH monitoring occasions may be referred to as PDCCH monitoring periods.

In a case where the ID of the search space for OSI or paging is not zero, and the UE is in an IDLE/INACTIVE mode, then the UE may determine PDCCH monitoring occasions for monitoring for OSI or paging based on the relationship between actually transmitted SSBs and PDCCH monitoring occasions (for example, § 7.1 of 3GPP TS 38.304, § 5 of TS 38.331, and the like).

FIG. 1 is a diagram to show an example of the relationship between PDCCH monitoring occasions and SSBs for OSI in Rel-15 NR.

A system information (SI) window length refers to the length of a window (period) that can be utilized for scheduling SI, and for example, 5 slots, 10 slots, . . . , 1280 slots, and so on may be configured for the UE through higher layer signaling.

In the present disclosure, for example, the higher layer signaling may be any one or combinations of Radio Resource Control (RRC) signaling, Medium Access Control (MAC) signaling, broadcast information, and the like.

The MAC signaling may use, for example, a MAC control element (MAC CE), a MAC Protocol Data Unit (PDU), or the like. For example, the broadcast information may be master information blocks (MIBs), system information blocks (SIBs), RMSI, OSI, and so on.

The system information (SI) periodicity corresponds to a periodicity of SI messages in units of radio frames, and for example, 8 radio frames, 16 radio frames, . . . , 512 radio frames, and so on may be configured for the UE through higher layer signaling.

For the UE, a higher layer parameter (for example, also referred to as a Radio Resource Control (RRC) parameter "ssb-PositionsInBurst") related to a transmission unit with some SSBs may be configured. The transmission unit for SSBs may be referred to as an SSB transmission period, an SSB set, an SS burst, or an SS burst set, or simply referred to as a burst. The SS burst may mean a set of SSBs included per half frame (0.5 radio frame). The higher layer parameter may be referred to as information (parameter) related to the time domain positions of SSBs in the SS burst. The present disclosure is described using ssb-PositionsInBurst as the higher layer parameter, but the name is not limited to this name.

ssb-PositionsInBurst may have a size (bit length) varying depending on a frequency utilized by a serving cell. ssb-PositionsInBurst may be defined as, for example, 4 bits for a frequency of 3 GHz or 2.4 GHz or less, 8 bits for a frequency of from 3 GHz or 2.4 GHz to 6 GHz, or 64 bits for the other frequencies. In other words, the size of ssb-PositionsInBurst may be 4 or 8 bits in a case where the SSBs have a subcarrier spacing (SCS) of 15 kHz or 30 kHz or more than 8 bits in a case where the SSBs have a subcarrier spacing of 120 kHz or 240 kHz. Of course, the frequency, the SCS, the size of ssb-PositionsInBurst, and so on are not limited to the above-described values.

ssb-PositionsInBurst is a bit map, and each bit in the bit map indicates an SSB transmission candidate position in the SS burst, for example, the leftmost bit (first) bit corresponds to SSB index #0, the second bit corresponds to SSB index #1, . . . . The value '1' of the bit indicates that the corresponding SSB is to be transmitted, and the value of '0' indicates that corresponding SSB is not to be transmitted.

Note that in the present disclosure, the SSB transmission candidate position may represent the position of the first symbol for an SSB candidate.

FIG. 1 shows the first, second, . . . , Nth, N+1th PDCCH monitoring occasions, . . . within the SI window. The UE may assume that the x*N+Kth (here, x=0, 1, . . . , X−1, and K=1, 2, . . . , N) PDCCH monitoring occasion corresponds to the Kth actually transmitted SSB.

Note that X may be a minimum integer equal to or greater than a value obtained by dividing the number of monitoring occasions within the SI window by N. N may correspond to the number of actually transmitted SSBs that is determined by ssb-PositionsInBurst (for example, the number is 8 or less in a case where ssb-PositionsInBurst includes 8 bits).

The UE may assume the same quasi-co-location (QCL) for PDCCH monitoring occasions associated with the same SSB. For example, in the first and N+1th PDCCH monitoring occasions in FIG. 1, the UE may receive the PDCCH on the assumption of the same QCL as that for the first SSB transmitted. PDCCH monitoring occasions with the same hatching in FIG. 1 may represent the application of the same beam (or the assumption of QCL with the same SSB). PDCCH monitoring occasions with different hatchings in FIG. 1 may represent the application of different beams (or the assumption of QCL with different SSBs).

Note that QCL may be an indicator indicating statistical properties of at least one of a signal and a channel (expressed as the signal/channel). For example, in a case where a certain signal/channel and another signal/channel are in a QCL relationship, this may mean that the plurality of different signals/channels can be assumed to be the same in at least one of a Doppler shift, a Doppler spread, an average delay, a delay spread, and a spatial parameter (for example, a spatial reception parameter (spatial Rx parameter)) (the signals/channels are QCLed with one another in terms of at least one of these factors).

The UE assuming that a certain control resource set (CORESET), channel, or reference signal is in a specific QCL relationship (for example, QCL type D) with another CORESET, channel, or reference signal may be referred to as a QCL assumption.

Figure 2:
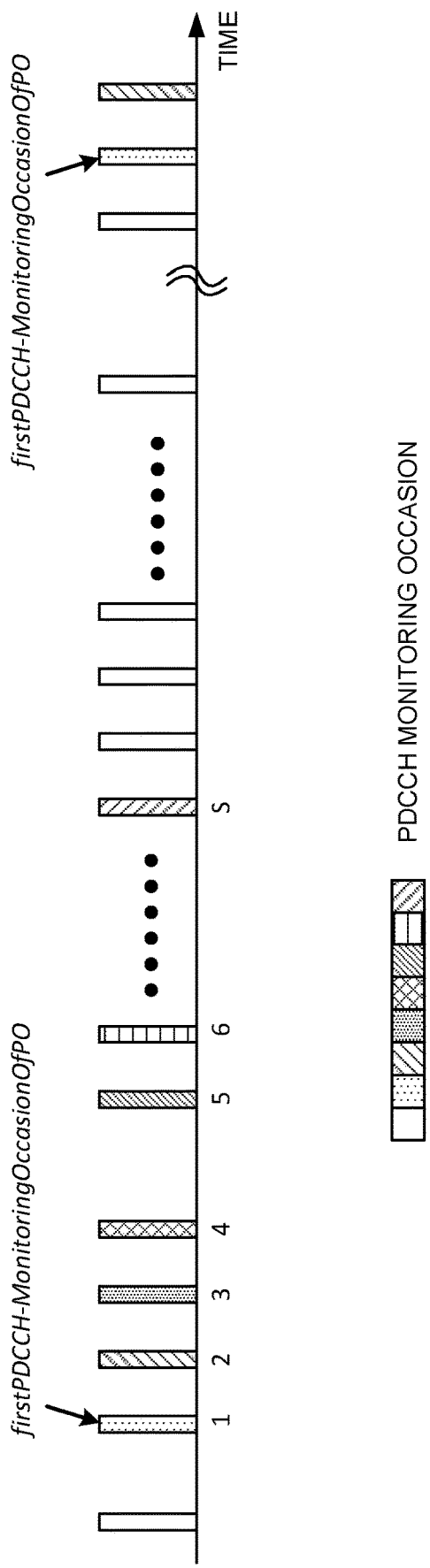
FIG. 2 is a diagram to show an example of a relationship between PDCCH monitoring occasions and SSBs for paging in Rel-15 NR.

FIG. 2 is a diagram to show an example of a relationship between PDCCH monitoring occasions and SSBs for paging in Rel-15 NR.

A start position for PDCCH monitoring for paging frames (PFs) and paging downlink control information (DCI) may be determined based on the ID of the UE. The PF may be defined by one or more radio frames.

The UE may be configured with a higher layer parameter (that may be referred to as, for example, an RRC parameter firstPDCCH-MonitoringOccasionOfPO) related to the first paging occasion (PO) in PF. The present disclosure is described using firstPDCCH-MonitoringOccasionOfPO as the higher layer parameter, but the name is not limited to this name.

In a case of being configured with firstPDCCH-MonitoringOccasionOfPO, the UE may assume that the PO corresponds to a period of S PDCCH monitoring occasions starting with the PDCCH monitoring occasion specified by firstPDCCH-MonitoringOccasionOfPO. The UE may perform PDCCH monitoring for paging on PDCCH monitoring occasions included in the PO (timings corresponding to hatched rectangles in FIG. 2). Note that rectangles not hatched in FIG. 2 may correspond to those of the PDCCH monitoring occasions on which no PDCCH monitoring for paging is performed.

FIG. 2 shows the first, second, . . . , Sth PDCCH monitoring occasions within the PO. The UE may assume that the Kth PDCCH monitoring occasion in the PO corresponds to the Kth actually transmitted SSB. In this regard, S may correspond to the number of actually transmitted SSBs that is determined by ssb-PositionsInBurst (for example, the number is 8 or less in a case where ssb-PositionsInBurst includes 8 bits). Different hatchings in FIG. 2 may represent the application of different beams (or the assumption of QCL with different SSBs).

Note that in a case where the ID of the search space for OSI or paging is not zero and the UE is in a CONNECTED mode, the UE may monitor all configured PDCCH monitoring occasions based on a search space configuration configured through higher layer signaling. In other words, in this case, the UE does not particularly assume the relationship between the monitored PDCCH monitoring occasions and SSB indices.

<SSBs in NR-U>

For NR-U, the use of SSBs has been under study. One continuous burst signal has also been under study that includes a Channel State Information (CSI)—Reference Signal (RS), an SSB burst set (set of SSBs), and a CORESET and a PDSCH associated with the SSB. The signal may also be referred to as a discovery reference signal (DRS or NR-U DRS), a reference signal for discovery, a discovery signal (DS), and so on.

The CORESET (PDCCH) associated with the SSB may also be referred to as a Remaining Minimum System Information (RMSI)-CORESET, CORESET #0, and so on. The RMSI may also be referred to as an SIB1. The PDSCH associated with the SSB may be a PDSCH carrying the RMSI (RMSI PDSCH) or a PDSCH scheduled by using the PDCCH in the RMSI-CORESET (DCI including a Cyclic Redundancy Check (CRC) scrambled with a System Information (SI)—Radio Network Temporary Identifier (RNTI)).

SSBs with different SSB indices may be transmitted by using different beams (base station transmission beams). An SSB and a corresponding RMSI PDCCH and a corresponding RMSI PDSCH may be transmitted by using the same beam.

For NR-U, expansion of transmission candidate positions of SSBs has been under study in consideration of a case where an SSB fail to be transmitted due to a failure in LBT. For example, a configuration has been under study in which, during a period when the DRS may be transmitted (DRS transmission window), SSB transmission candidate positions are expanded to transmit an SSB (beam) having failed to be transmitted due to a failure in LBT, by using another transmission candidate position within the window.

Note that the length of the DRS transmission window may be configured for the UE through higher layer signaling or defined in accordance with specifications. The DRS transmission window may be referred to as a DRS transmission period, a DRS transmission window period, and so on.

FIGS. 3A and 3B are diagrams to show an example of expansion of SSB transmission candidate positions. In the present example, the serving cell (or SSB) is assumed to have an SCS of 30 kHz and a slot length of 0.5 ms. The length of the DRS transmission window is assumed to be 5 ms. A similar SCS and a similar DRS transmission window length are assumed for the subsequent drawings. Note that the application of the present disclosure is not limited to these SCS and DRS transmission window.

In FIG. 3A, DRS is transmitted over four slots (slots #0 to #3). In this regard, at slot #0 in FIG. 3A, an SSB, a CORESET (PDCCH) associated with the SSB, and a PDSCH (a part except for the SSB and CORESET) associated with the SSB are shown. The other slots may have a similar arrangement. In FIG. 3A, SSB #i (i=from 0 to 7) and RMSI #i (PDCCH/PDSCH) may be transmitted by using the same beam.

FIG. 3B shows slots #0 and #1 in FIG. 3A failing to be transmitted due to LBT busy (LBT failure). In this case, the UE may assume that the beams of SSBs #0 to #3 not transmitted are respectively transmitted in slots after SSBs #4 to #7 by using SSBs #8 to #11.

In other words, in the present example, PDCCH monitoring occasions for RMSI are associated with SSB indices corresponding to SSB candidate positions within the DRS window.

Figure 4:
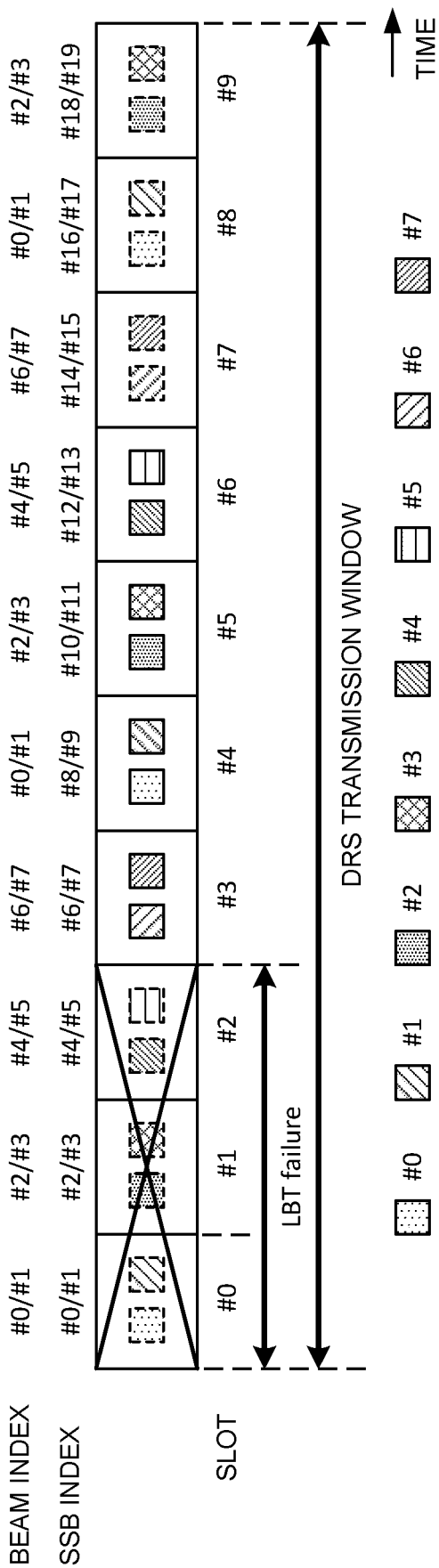
FIG. 4 is a diagram to show another example of expansion of SSB transmission candidate positions.

FIG. 4 is a diagram to show another example of expansion of SSB transmission candidate positions. The present example illustrates a case in which the number of transmission SSBs is eight and is the same as the number of beams (the number of beams is also eight (beam indices #0 to #7)). In this case, beam index #k corresponds to SSB index #8i+k (i=0, 1, 2).

As described above, in Rel-15 NR, the RRC parameter ssb-PositionsInBurst is used to notify the indices of actually transmitted SSBs. However, in NR-U, SSBs may be transmitted at positions (different SSB indices) different from SSB candidate positions semi-statically configured for the UE by ssb-PositionsInBurst as shown in FIG. 3B and FIG. 4. Furthermore, the indices of the actually transmitted SSBs may be changed for each DRS transmission period.

For NR-U, studies have also been conducted about reception of OSI, paging, and the like by using an NR-U carrier in order to support a standalone operation. As shown in FIGS. 1 and 2, in Rel-15 NR, in a case where any search space other than search space zero is used in the IDLE/INACTIVE mode, the PDCCH monitoring occasions are determined based on the relationship with the indices of the actually transmitted SSBs. However, even in a case where actual transmission is performed at SSB candidate positions expanded due to LBT failure, the UE determines the positions of indices of the SSBs transmitted by ssb-PositionsInBurst. The relationship between the expanded SSB indices not expressed by ssb-PositionsInBurst and the PDCCH monitoring periods is not clear.

For FR1 in NR heretofore studied, up to four or eight SSBs can be used at maximum. However, fewer SSBs may be actually transmitted. For example, in a case where a QCL assumption is used that includes the precondition that eight SSBs are transmitted as shown in FIG. 4, SSB candidate positions available (candidate resources, candidate SSB indices) are limited in a case where less than eight SSBs are actually transmitted.

For SSBs in NR heretofore studied, up to two SSBs are assigned to each slot. However, for flexible control, only one SSB may be used for each slot. Failure to properly define how to deal with SSB candidate index unused (for example, which of the SSB indices may be assumed to be QCLed) leads to unclear operations of the base station, UE, and the like.

These problems will be described by using FIGS. 5A and 5B. FIGS. 5A and 5B are diagrams to show an example of a problem with the QCL assumption for SSBs.

FIG. 5A corresponds to a case where the number of SSBs (number of beams) is less than eight. In the present example, ssb-PositionsInBurst indicates SSB indices #0 to #3, and beam indices #0 to #3 correspond to SSB indices #0 to #3.

In the present example, slots #0 to #2 are not transmitted due to failure in LBT. The problem is which of the SSB transmission candidate positions is used to transmit beam indices #0 to #3 corresponding to SSB indices #0 to #3, which have been intended to be transmitted in slots #0 and #1. The use of fixed relationship corresponding to the SSB number of 8 as shown in FIG. 4 leads to beam indices #0 to #3 corresponding to SSB indices #8 to #11 but prevents utilization of SSB indices #4 to #7. A QCL assumption is desired that allows free candidate SSB indices to be efficiently used.

FIG. 5B corresponds to a case where the number of SSBs (number of beams) is one per slot. In the present example, ssb-PositionsInBurst indicates SSB indices #0, #2, #4, and #6, and beam indices #0 to #3 correspond to SSB indices #0, #2, #4, and #6, respectively.

In the present example, slots #0 to #2 are not transmitted due to failure in LBT. The problem is which of the SSB transmission candidate positions is used to transmit beam indices #0 to #2 corresponding to SSB indices #0, #2, and #4, which have been intended to be transmitted in slots #0 and #2. Beam indices #0 to #2 may be respectively transmitted by using SSB indices #7 to #9 immediately after SSB index #6 or by using SSB indices #8, #10, and #12 in order to maintain the SSB number of 1 per slot. Specifications heretofore studied fail to allow determination of which set of SSB indices is to be used.

As described above, sufficient studies have not been conducted about suitable determination, by the UE, of the QCL assumption between SSB indices in consideration of an LBT failure in a case where ssb-PositionsInBurst is used to notify semi-statically transmitted SSBs. Lack of definite specification for this determination may prevent suitable monitoring of the PDCCH, reducing communication throughput.

Thus, the inventors of the present invention clarified the QCL assumption between SSB indices (SSB transmission candidate positions) in an NR-U carrier and came up with a method for implementing an operation appropriately using SSBs even in a case where the indices (positions) of SSBs transmitted by using certain beams are changed in accordance with an LBT result.

Embodiments according to the present disclosure will be described in detail with reference to the drawings as follows. The radio communication method according to each embodiment may be employed independently or may be employed in combination.

Note that in the present disclosure, the SSB corresponding to an SSB index is also simply referred to as the SSB index. The beam corresponding to a beam index is also simply referred to as the beam index.

NR-U in the present disclosure is not limited to LAA but may include a case where an unlicensed band is used in a standalone manner.

(Radio Communication Method)

In one embodiment, the QCL assumption between SSB indices in the NR-U carrier may be determined by using specifications and higher layer signaling. For example, the UE may assume that each SSB index up to a slot containing an SSB that corresponds to the maximum SSB index notified by the certain higher layer parameter (for example, ssb-PositionsInBurst) is QCLed in order with SSBs corresponding to SSB indices of slots after the slot.

Figure 6:
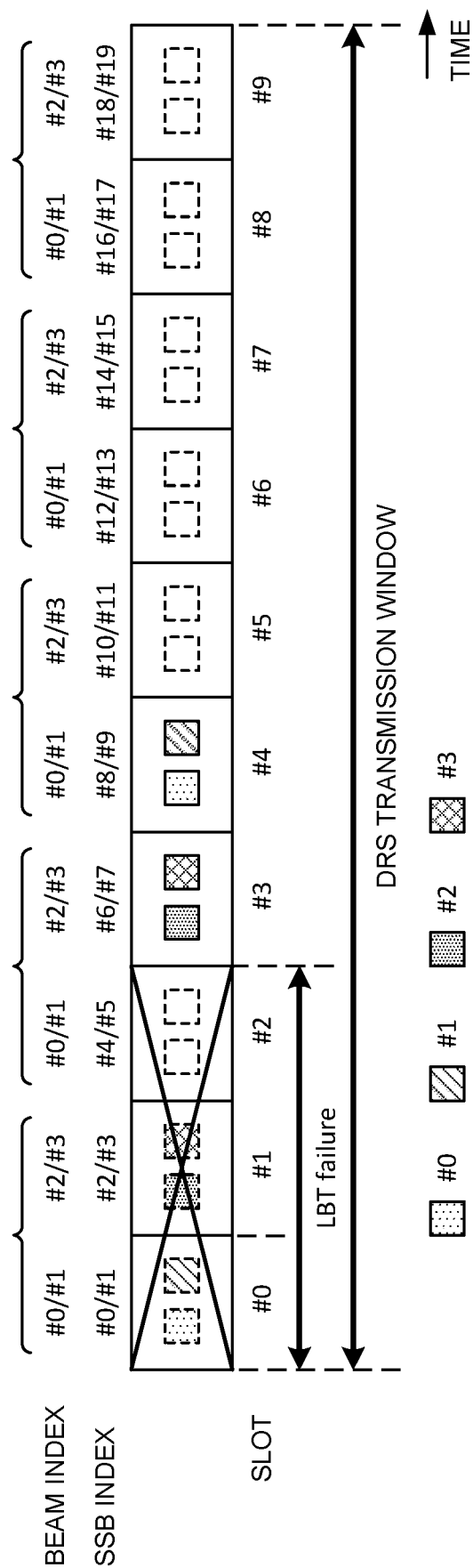
FIG. 6 is a diagram to show an example of the QCL assumption between SSB indices according to one embodiment.

FIG. 6 is a diagram to show an example of the QCL assumption between SSB indices according to one embodiment. The present example illustrates a case in which ssb-PositionsInBurst indicates SSB indices #0 to #3, in other words, a case in which the maximum SSB index indicated by ssb-PositionsInBurst is 3.

In this case, beam indices #0 to #3 correspond to SSB indices #0 to #3. The UE may assume that SSB indices #4i to #4i+3 (i is a natural number) are respectively QCLed with SSB indices #0 to #3. In other words, in the present example, the maximum SSB index indicated by ssb-PositionsInBurst corresponds to the last SSB in a certain slot, and thus repetitions of beams are separated from one another by slots. This is suitable for control.

In the present example, slots #0 to #2 are not transmitted due to failure in LBT. Beam indices #0 to #3 corresponding to SSB indices #0 to #3, which have been intended to be transmitted in slots #0 and #1, may be transmitted in slots #3 and #4 within the same DRS transmission window (SSB indices #6 to #9).

The UE may assume that SSB indices #6, #7, #8, and #9 are respectively QCLed with SSB indices #2, #3, #0, and #1. In other words, the UE may assume that SSB indices #6, #7, #8, and #9 are transmitted by respectively using beam indices #2, #3, #0, and #1.

Figure 7:
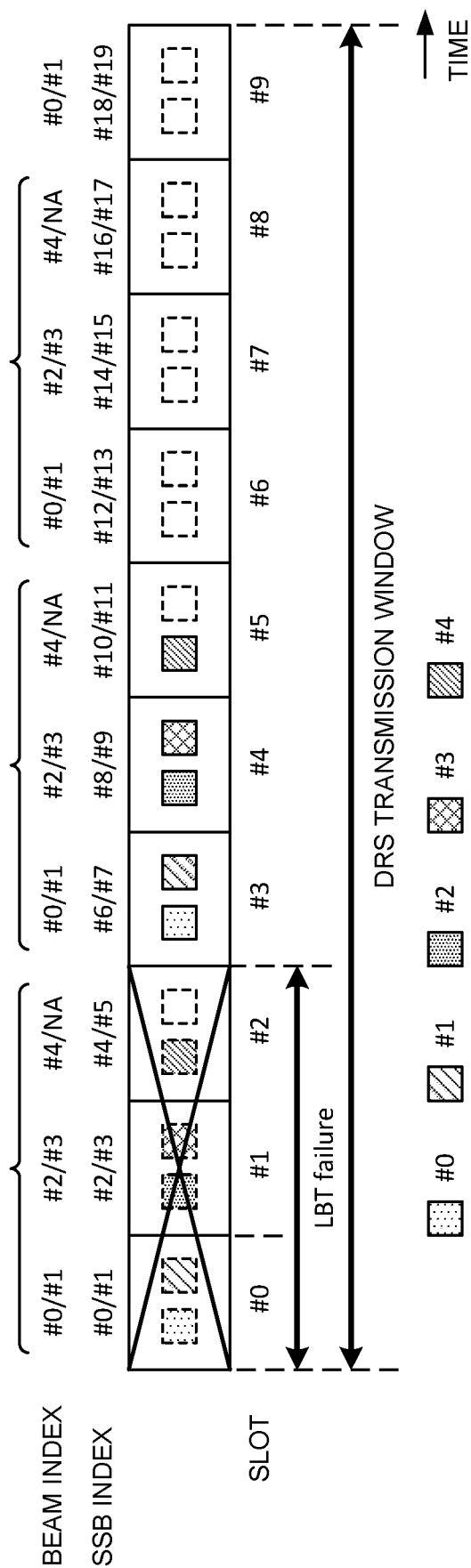
FIG. 7 is a diagram to show another example of the QCL assumption between SSB indices according to one embodiment.

FIG. 7 is a diagram to show another example of the QCL assumption between SSB indices according to one embodiment. The present example illustrates a case in which ssb-PositionsInBurst indicates SSB indices #0 to #4, in other words, a case in which the maximum SSB index indicated by ssb-PositionsInBurst is 4.

In this case, beam indices #0 to #4 correspond to SSB indices #0 to #4. The UE may assume that SSB index #5 included in the same slot as that in which SSB index #4 corresponding to the maximum SSB index indicated by ssb-PositionsInBurst is included is invalid (not available/not applicable (NA)), and need not count SSB index #5 as the number of SSBs actually transmitted.

The UE may assume that SSB indices #6i to #6i+4 (i is a natural number) are respectively QCLed with SSB indices #0 to #4. The UE may assume that SSB index #6i+5 is NA as is the case with SSB index #5. In other words, in the present example, even in a case where the maximum SSB index indicated by ssb-PositionsInBurst is not the last SSB in a certain slot, repetitions of beams can be separated from one another by slots. This is suitable for control.

In the present example, slots #0 to #2 are not transmitted due to failure in LBT. Beam indices #0 to #4 corresponding to SSB indices #0 to #4, which have been intended to be transmitted in slots #0 to #2, may be transmitted in slots #3 to #5 within the same DRS transmission window (SSB indices #6 to #10).

The UE may assume that SSB indices #6, #7, #8, #9, and #10 are respectively QCLed with SSB indices #0, #1, #2, #3, and #4. In other words, the UE may assume that SSB indices #6, #7, #8, #9, and #10 are transmitted by respectively using beam indices #0, #1, #2, #3, and #4.

Figure 8:
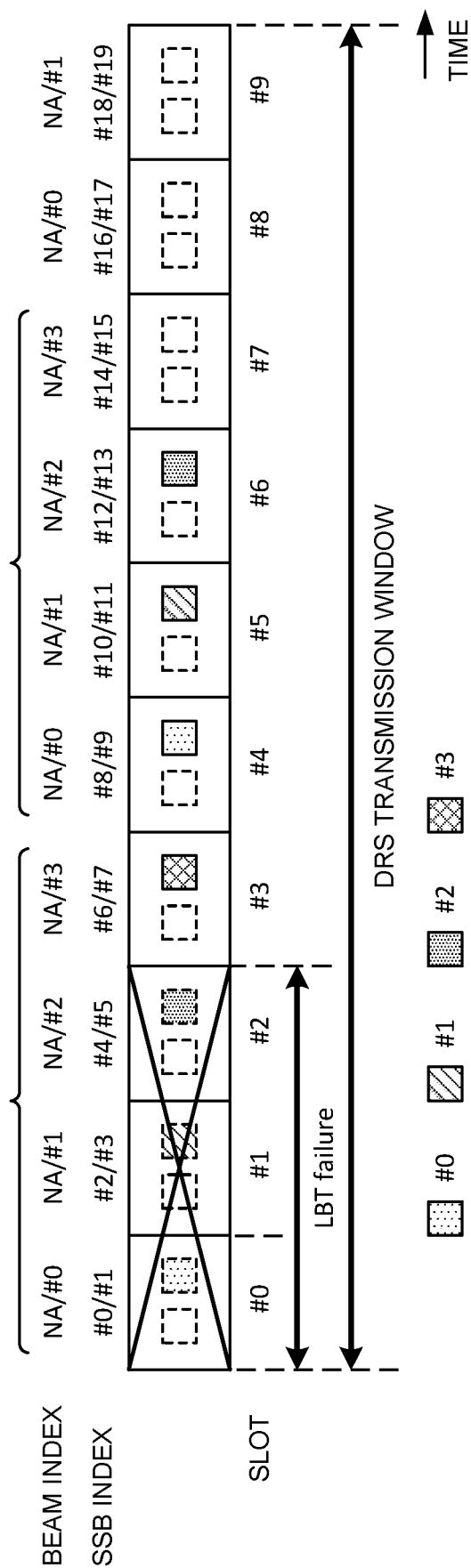
FIG. 8 is a diagram to show yet another example of the QCL assumption between SSB indices according to one embodiment.

FIG. 8 is a diagram to show yet another example of the QCL assumption between SSB indices according to one embodiment. In the present example, in the illustrated case, ssb-PositionsInBurst indicates SSB indices #1, #3, #5, and #7. In other words, the maximum SSB index indicated by ssb-PositionsInBurst is 7.

In this case, beam indices #0, #1, #2, and #3 correspond to SSB indices #1, #3, #5, and #7. The UE may assume that of the SSB indices from SSB index #0 up to SSB index #7 corresponding to the maximum SSB index indicated by ssb-PositionsInBurst, off SSB indices #0, #2, #4, and #6 (corresponding to '0') are invalid (NA), and need not count the off SSB indices as the number of SSBs actually transmitted.

The UE may assume that SSB indices #8i+1, #8i+3, #8i+5, and #8i+7 are respectively QCLed with SSB indices #1, #3, #5, and #7. The UE may assume that SSB indices #8i, #8i+2, #8i+4, and #8i+6 are NA as is the case with SSB indices #0, #2, #4, and #6. In other words, in the present example, any SSB index can be prevented from being considered to be in QCL with an NA SSB index.

In the present example, slots #0 to #2 are not transmitted due to failure in LBT. SSB index #7 in slot #3 is transmitted by using beam index #3. Beam indices #0, #1, and #2 corresponding to SSB indices #1, #3, and #5, which have been intended to be transmitted in slots #0 to #2, may be transmitted in slots #4 to #6 within the same DRS transmission window (SSB indices #9, #11, and #13).

The UE may assume that SSB indices #9, #11, and #13 are respectively QCLed with SSB indices #1, #3, and #5. In other words, the UE may assume that SSB indices #7, #9, #11, and #13 are transmitted by respectively using beam indices #3, #0, #1, and #2.

Note that, in one embodiment, the UE may assume that the SSB indices in periods up to a certain period (at least one of, for example, a subframe, a half slot, a symbol, and so on) including the SSB corresponding to the maximum SSB index indicated by ssb-PositionsInBurst are QCLed in order with SSBs corresponding to the SSB indices in periods after the certain period.

Note that in one embodiment, the SSB transmission candidate positions in the NR-U carrier may be present in all the slots within a certain period (for example, a half frame with a 5-ms length). The SSB transmission candidate positions may be specified beyond the certain period (for example, for up to 6 ms).

For example, in a case where the period of the DRS transmission window can be configured for the UE through higher layer signaling, the SSB transmission candidate positions and the SSB indices may be specified for all the slots within the period of the configured DRS transmission window.

In this regard, for the SSB transmission candidate positions within the slot, at least one of cases A, B, C, D, and E specified in TS 38.213 § 4.1 Cell search in 3GPP Rel-15 may be used based on SCS, or any other candidate positions may be used.

Note that the case A and the case C may correspond to a case where two SSBs within one slot are not consecutive (are separate from each other) in the time domain. The case A may be used for a 15-kHz SCS. The case C may be used for a 30-kHz SCS. The case B may correspond to a case where two SSBs within one slot are consecutive in the time domain. The case B may be used for a 30-kHz SCS.

Note that for the 30-kHz SCS, the case used (for example, at least one of the cases B and C) may be defined in accordance with the specifications or notified through higher layer signaling, physical layer signaling, or a combination of the higher layer signaling and physical layer signaling.

Some of the SSB transmission candidate positions may be invalid. For example, in ssb-PositionsInBurst, a skipped SSB index (in other words, the SSB index corresponding to a bit corresponding to '0' and followed by far '1') and the SSB index QCLed with the above-described SSB index may be assumed to be invalid, as shown in FIG. 7 and FIG. 8. In ssb-PositionsInBurst, an SSB index corresponding to a bit corresponding to '0' and corresponding to the same slot as that which includes the maximum SSB index and an SSB index QCLed with the above-described SSB index may be assumed to be invalid.

In one embodiment, in a monitoring operation of the paging PDCCH in the NR-U carrier, the PO may include PDCCH monitoring occasions identical in number to all available/applicable SSB transmission candidate positions. In other words, the number S of PDCCH monitoring occasions within the PO described above in connection with FIG. 2 may be interpreted as the number of the available/applicable SSB transmission candidate positions.

In this regard, the available/applicable SSB transmission candidate positions may include SSB indices indicated by ssb-PositionsInBurst to be transmitted and SSB indices assumed to be QCLed with SSB indices included within the DRS transmission window.

In other words, the number of the available/applicable SSB transmission candidate positions may be the total of the number of SSB indices indicated by ssb-PositionsInBurst to be transmitted and the number of SSB indices assumed to be QCLed with the SSB indices included within the DRS transmission window.

This will be described taking FIG. 7 as an example. In FIG. 7, the SSB indices instructed by ssb-PositionsInBurst to be transmitted include five SSB indices #0 to #4. The SSS indices QCLed with SSB indices #0 to #4 within the DRS transmission window include 12 SSB indices #6 to #10, #12 to #16, and #18 and #19. Consequently, 17 SSB transmission candidate positions (SSB indices) are available/applicable.

Figure 9:
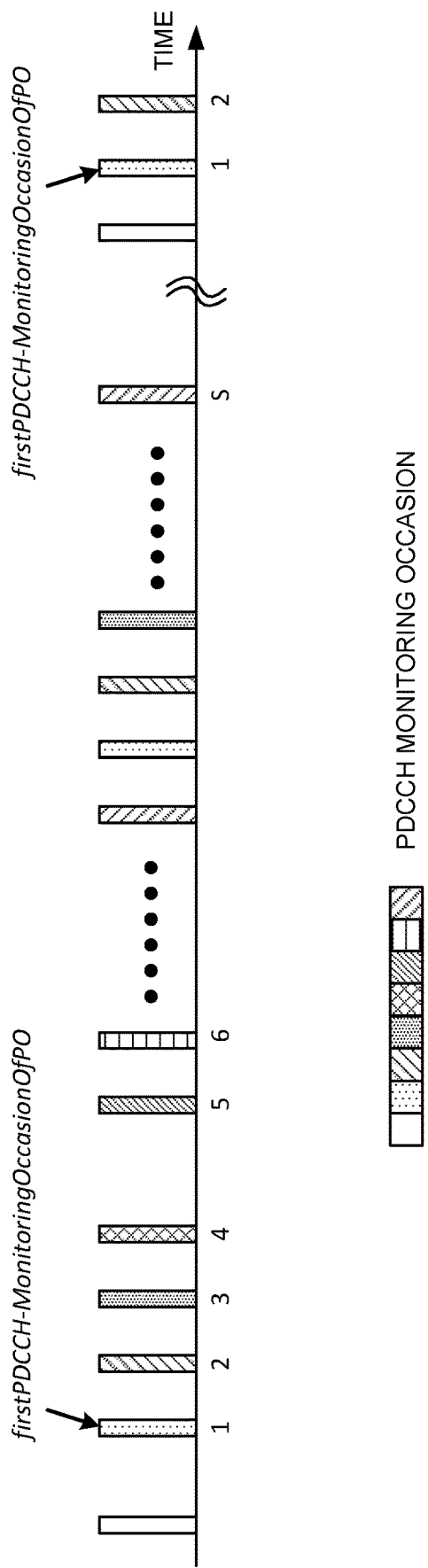
FIG. 9 is a diagram to show an example of a relationship between PDCCH monitoring occasions and SSBs for paging according to one embodiment.

FIG. 9 is a diagram to show an example of a relationship between PDCCH monitoring occasions and SSBs for paging according to one embodiment. FIG. 2 differs from FIG. 9 in that in FIG. 2, S PDCCH monitoring occasions correspond to different beams, whereas in FIG. 9, the S PDCCH monitoring occasions include PDCCH monitoring occasions corresponding to the same beam (based on the same QCL assumption).

The embodiment described above allows the QCL assumption between SSB indices to be appropriately determined.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 10:
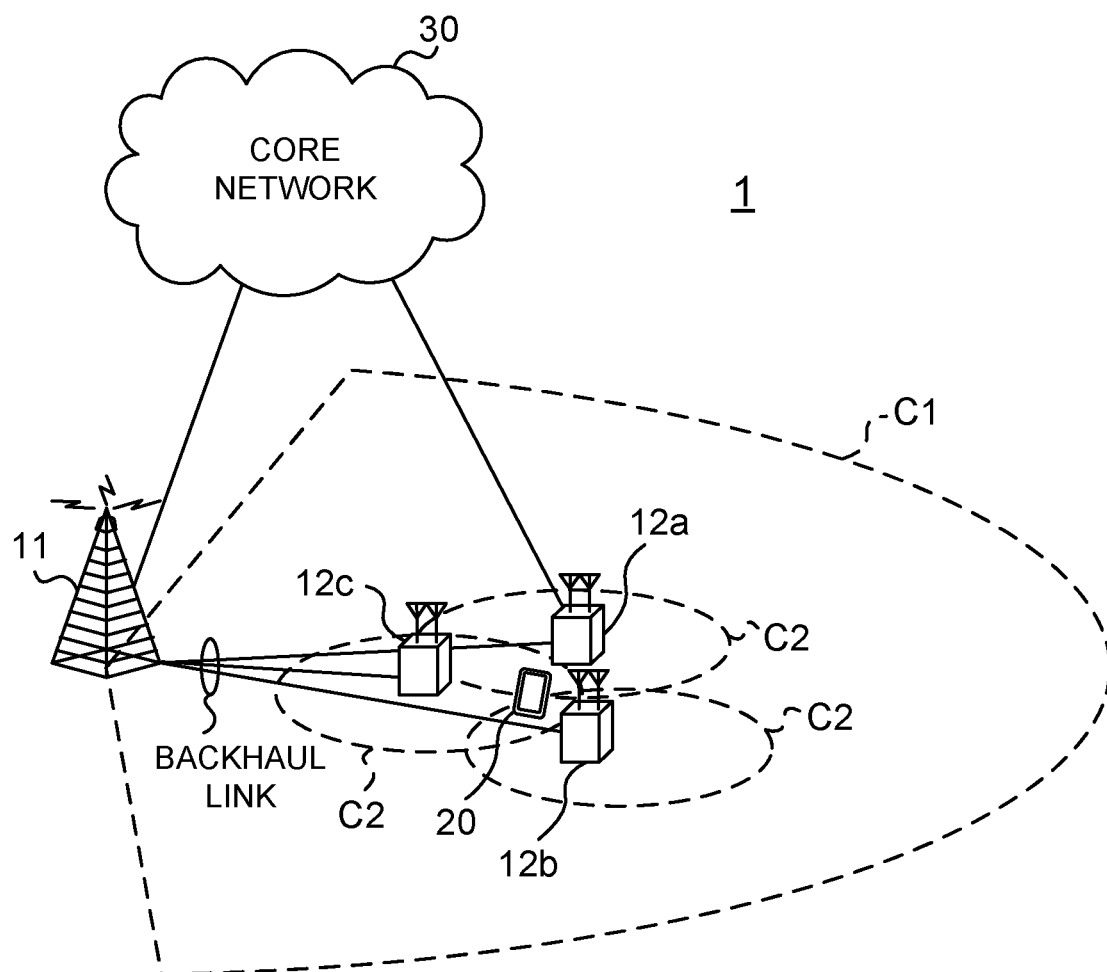
FIG. 10 is a diagram to show an example of a schematic structure of a radio communication system according to one embodiment.

FIG. 10 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 11:
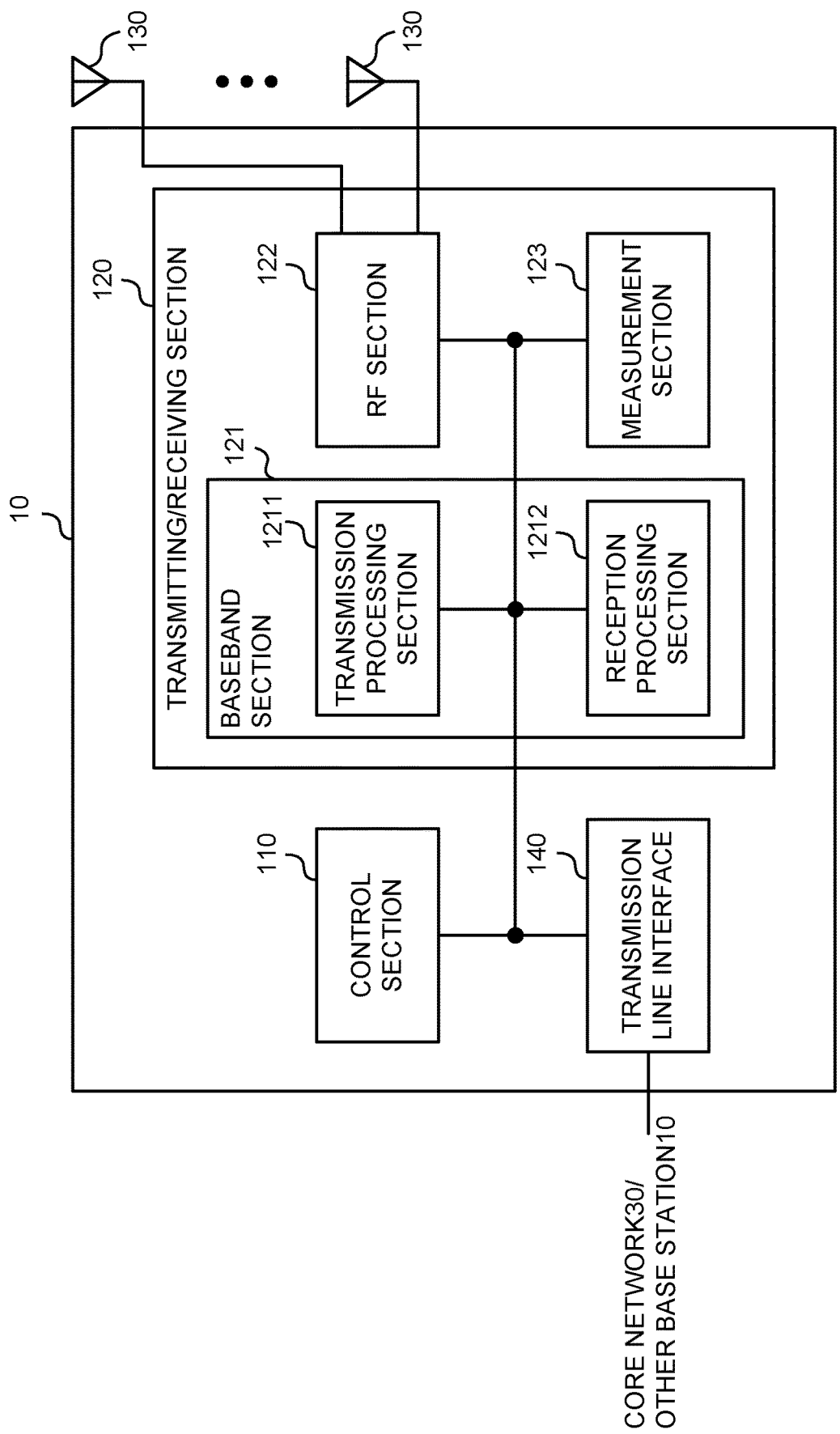
FIG. 11 is a diagram to show an example of a structure of a base station according to one embodiment.

FIG. 11 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit, to the user terminal 20, information (for example, the higher layer parameter "ssb-PositionsInBurst") related to the positions of synchronization signal blocks (SSBs) within a synchronization signal (SS) burst.

The transmitting/receiving section 120 may transmit the SSB, the DRS, and so on.

(User Terminal)

Figure 12:
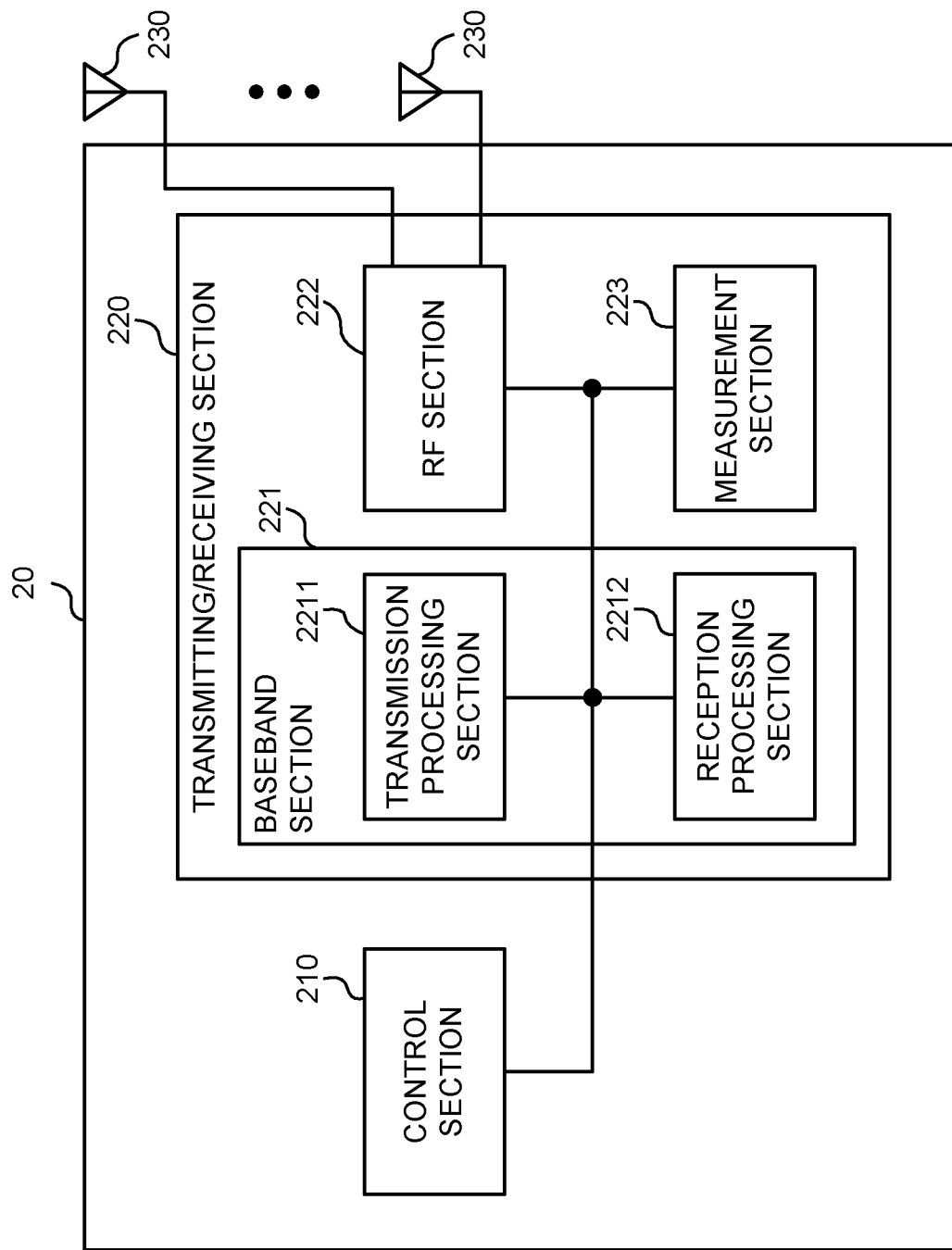
FIG. 12 is a diagram to show an example of a structure of a user terminal according to one embodiment.

FIG. 12 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the transmitting/receiving section 220 may receive the information (for example, the higher layer parameter "ssb-PositionsInBurst") related to the positions of the synchronization signal blocks (SSBs) within the synchronization signal (SS) burst.

Based on the information related to the positions of the SSBs within the SS burst, the control section 210 may determine the Quasi-Co-Location (QCL) assumption between SSB indices within the transmission window for the discovery reference signal (DRS) in the carrier to which listening is applied (for example, the unlicensed carrier).

Note that the carrier to which listening is applied may be referred to as an LAA cell, an LAA secondary cell (LAA SCell), or the like. In the carrier to which listening is applied, the user terminal 20 may perform listening before transmission. In this regard, the "listening" in the present disclosure may be interpreted as at least one of Listen Before Talk (LBT), Clear Channel Assessment (CCA), carrier sense, sensing, channel sensing, a channel access operation, and so on.

The control section 210 may assume that each SSB index up to a slot containing an SSB that corresponds to the maximum SSB index notified by the information related to the positions of the SSBs within the SS burst is QCLed in order with SSBs corresponding to SSB indices of slots after the slot.

The control section 210 may assume that in the DRS transmission window, the QCL assumption for SSB indices is repeatedly used in the units of periods from the leading slot of ssb-PositionsInBurst to the slot including the SSB corresponding to the maximum SSB index. For example, the control section 210 may assume that the QCL assumption in the units of periods is applied from the slot following the slot including the SSB corresponding to the maximum index.

The control section 210 may consider that, in a slot containing an SSB that corresponds to the maximum SSB index, SSB indices greater than the maximum SSB index are invalid (need not count the SSB indices as the number of actually transmitted SSBs).

The control section 210 may assume that the number of Physical Downlink Control Channel (PDCCH) monitoring occasions for paging included in paging occasions in the carrier to which listening is applied is determined based on the sum of the number of one or more SSB transmitted indices notified by the information related to the positions of the SSBs within the SS burst and the number of SSB indices QCLed with the one or more transmitted SSB indices.

The control section 210 may determine the QCL assumption between the PDCCH and the SSB on PDCCH monitoring occasions for reception of at least one of other system information (OSI) and paging, based on the various types of QCL assumption, and monitor (or receive) the PDCCH. Note that OSI, paging, and the like may be interpreted as any other information (for example, a specific DCI format).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 13:
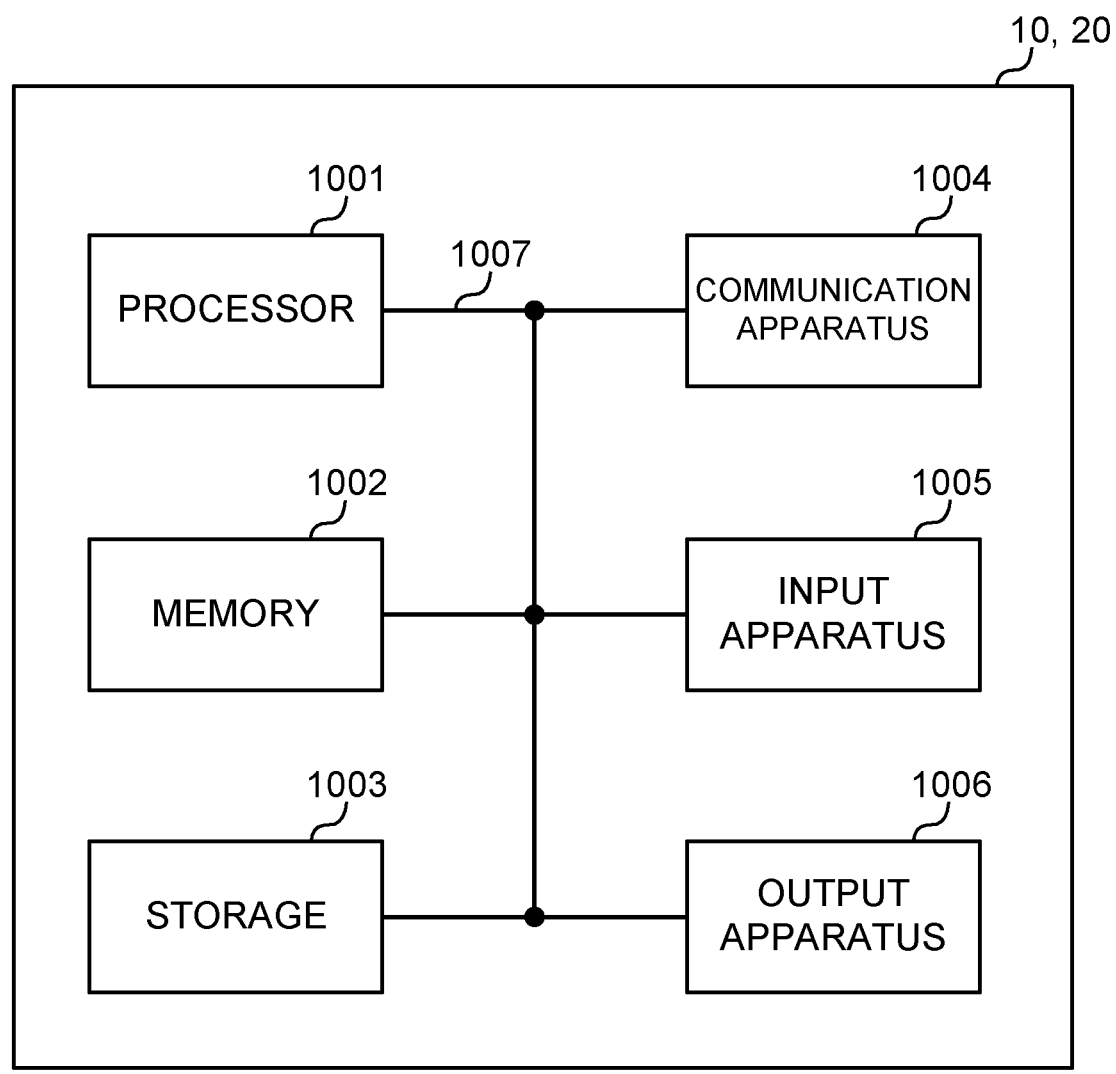
FIG. 13 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 13 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal,"

"wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
    a receiver that receives information regarding a synchronization signal block (SSB) position within a synchronization signal (SS) burst; and
    a processor that assumes that, in a discovery reference signal transmission window configured based on higher layer signaling, each SSB up to a slot including an SSB corresponding to a maximum SSB index that is indicated by the information regarding the SSB position within the SS burst is quasi-co-located (QCLed) in order with each SSB of one or more slots subsequent to the slot including the SSB corresponding to the maximum SSB index.

2. The terminal according to claim 1, wherein an SSB transmission candidate position is configured for all slots within the discovery reference signal transmission window.

3. The terminal according to claim 1, wherein the discovery reference signal transmission window is 5 ms.

4. The terminal according to claim 1, wherein the SSB transmission candidate position is based on subcarrier spacing.

5. A radio communication method for a terminal, comprising:
    receiving information regarding a synchronization signal block (SSB) position within a synchronization signal (SS) burst; and
    assuming that, in a discovery reference signal transmission window configured based on higher layer signaling, each SSB up to a slot including an SSB corresponding to a maximum SSB index that is indicated by the information regarding the SSB position within the SS burst is quasi-co-located (QCLed) in order with each SSB of one or more slots subsequent to the slot including the SSB corresponding to the maximum SSB index.

6. A base station comprising:
    a transmitter that transmits information regarding a synchronization signal block (SSB) position within a synchronization signal (SS) burst; and
    a processor that assumes that, in a discovery reference signal transmission window configured by higher layer signaling, each SSB up to a slot including an SSB corresponding to a maximum SSB index that is indicated by the information regarding the SSB position within the SS burst is quasi-co-located (QCLed) in order with each SSB of one or more slots subsequent to the slot including the SSB corresponding to the maximum SSB index.

7. A system comprising a terminal and a base station, wherein
    the terminal comprises:
        a receiver that receives information regarding a synchronization signal block (SSB) position within a synchronization signal (SS) burst; and
        a processor that assumes that, in a discovery reference signal transmission window configured based on higher layer signaling, each SSB up to a slot including an SSB corresponding to a maximum SSB index that is indicated by the information regarding the SSB position within the SS burst is quasi-co-located (QCLed) in order with each SSB of one or more slots subsequent to the slot including the SSB corresponding to the maximum SSB index, and
    the base station comprises:
        a transmitter that transmits the information regarding the SSB position within the SS burst.

* * * * *